May 24, 1966  H. A. GODDARD  3,252,220
ARTIFICIAL DENTURE
Filed May 4, 1964  3 Sheets-Sheet 1
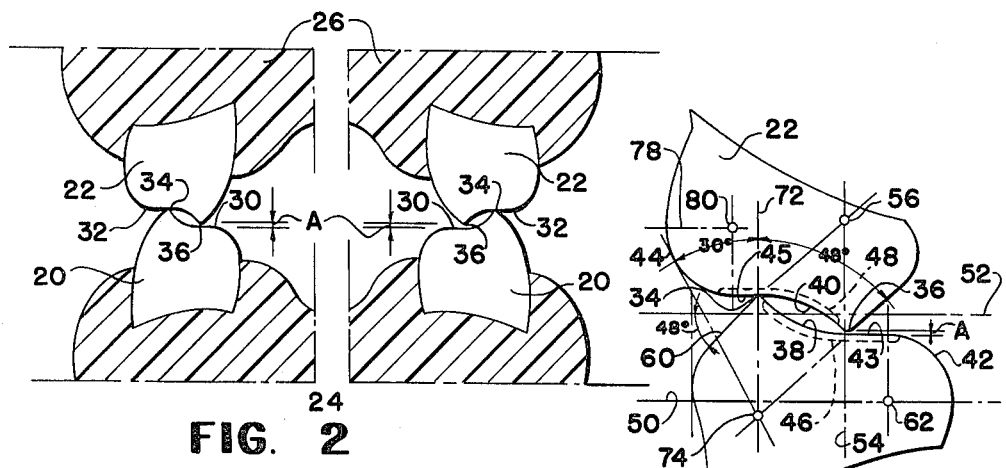
FIG. 2
FIG. 1
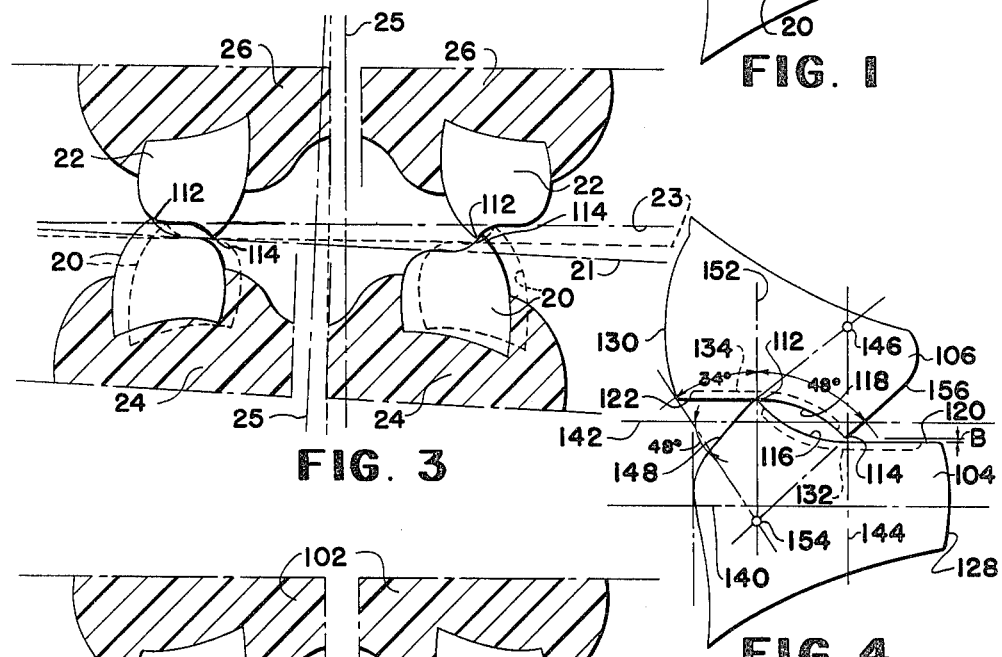
FIG. 3
FIG. 4
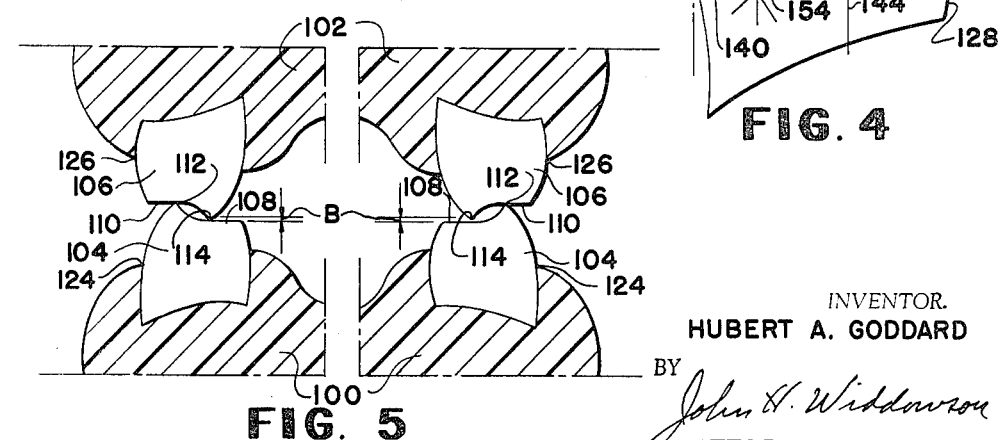
FIG. 5
INVENTOR.
HUBERT A. GODDARD
BY John H. Widdowson
ATTORNEY May 24, 1966  H. A. GODDARD  3,252,220
ARTIFICIAL DENTURE Filed May 4, 1964  3 Sheets-Sheet 3

INVENTOR.
HUBERT A. GODDARD
BY John H. Widdowson
ATTORNEY

United States Patent Office 3,252,220
Patented May 24, 1966

3,252,220
ARTIFICIAL DENTURE
Hubert A. Goddard, 228 N. Howard, Pratt, Kans.
Filed May 4, 1964, Ser. No. 364,626
12 Claims. (Cl. 32—2)

This application is a continuation of my application entitled "Improved Artificial Denture," Serial No. 227,438, filed October 1, 1962, and now abandoned.

This invention relates to artificial teeth or dentures. In a more specific aspect the invention relates to an artificial tooth which is constructed and adapted to be mounted in a dental plate or the like and positioned in the mouth of a person to replace a natural tooth. In a still more specific aspect the invention relates to an improved artificial tooth which is constructed and adapted when in engagement with other teeth to prevent locking of the artificial tooth, form a balanced occlusion, and improve mastication. In another aspect the invention relates to new mounting means for an artificial tooth.

Various types of artificial teeth and dentures are known to the art. In many instances the prior art artificial teeth and dentures are constructed to closely approximate the size and shape of real teeth and are somewhat difficult to shape and form. Also, many of the prior art dentures or teeth are constructed so that the biting surface thereof is irregular in shape and includes closed valleys or troughs therein which are engageable by portions of opposing teeth, either natural or artificial teeth, and cause locking of the teeth and dentures in use making wearing of the denture or teeth uncomfortable in many instances and unsatisfactory for thoroughly masticating food and the like by the wearer. In addition, some of the prior art artificial teeth are shaped and constructed so that perfect mounting must be achieved in order to obtain proper mastication between opposing teeth. Normally the artificial teeth of the prior art must be accurately positioned relative to other teeth in the mouth to prevent undesirable pressure from being transmitted through the teeth to the gums, causing sore spots and sensitive areas on the gum which are quite painful to the user. Further, artificial teeth known to the prior art in masticating food and the like force the food outwardly against the cheeks. This effect is annoying and also decreases the efficiency of the teeth.

In my Patent No. 2,617,192 titled Artificial Denture, teeth and denture means are shown which are a decided improvement over many of the prior art constructions. However, the valleys or troughs formed in the teeth of my before-mentioned patent may limit relative lateral movement between opposing teeth. The teeth and denture means of the present invention permits desirable lateral movement of upper and lower teeth relative to each other without locking. Also, the masticating surface of the teeth of the present invention is constructed to improve the ability of the wearer to easily masticate food.

In accordance with the present invention, new artificial teeth are provided which are constructed and adapted to overcome the defficiencies of the prior art, including the denture means of my before-mentioned patent and substantially eliminates the possibility of locking of teeth and substantially reducing the degree of register required between teeth to eliminate undesirable pressures and sore spots on the gum as a result of improper fit of the dentures. The artificial tooth of the invention has a concavity on the upper or masticating surface of the tooth and a ridge at one edge of the concavity which forms a cutting cusp. The tooth is free of obstructions at the edge portion thereof opposite from the ridge with the plane through the surface of the concavity at the opposite edge portion being substantially parallel to the gum line when mounted in a dental plate or the like. The tooth is constructed and adapted to be mounted in the mouth with the ridge being positionable to engage a center portion of an opposing tooth when in biting relation therewith.

The artificial tooth of the invention can be provided with a mounting groove therein at a side of the tooth and the tooth constructed and adapted to be mounted in a molded plate within an integral portion of the plate positioned in the groove to thereby mount the tooth therein.

My invention also encompasses a denture having upper and lower artificial teeth positioned in opposed relation. Each of the teeth in the denture has a concavity and a ridge at one edge opposite the concavity forming a cusp. The upper and lower teeth are positioned in the denture with the ridges formed by the cusps of the respective teeth forming generally parallel lingual and buccal ridges. The buccal ridge is constructed to strike the concavity of the opposing teeth forming cutting means for food, and the lingual ridge is constructed to assume a spaced relation with the concavities of the opposing teeth when the denture is in biting position to thereby form a crushing means that directs the resultant masticated food toward the lingual side.

Accordingly, it is an object of the invention to provide a new artificial tooth construction.

Another object of the invention is to provide a new lockless construction for artificial teeth and the like.

Another object is to provide a new artificial tooth that when mounted in a dental plate will produce for the wearer thereof a new masticating action.

A further object of the invention is to provide a new artificial tooth having a concavity therein with a ridge forming a cutting cusp at one edge of the concavity and with the edge portion of the tooth opposite from the ridge being free of obstructions which might cause locking of the teeth in use.

A further object of the invention is to provide new means for mounting an artificial tooth or the like in a dental plate.

A further object of the invention is to provide a new artificial tooth construction having a ridge at one edge portion thereof adjacent to a concavity in the tooth with the edge portion of the tooth opposite from the ridge being convex in shape and smoothly joined to the concavity.

A further object of the invention is to provide a new artificial tooth having a ridge at one edge portion and an adjacent concavity terminating at said ridge with the edge portion of the tooth opposite from the ridge being flat and smoothly merging into the concavity.

Another object of the invention is to provide an opposed pair of teeth having a single cusp on the lingual side engaging a concavity on the opposite tooth, and a pair of crushing surfaces on the buccal side, which teeth in use cut the food, crush it, and subsequently force it inwardly to the tongue.

A further object of the invention is to provide a new artificial tooth or the like which requires less cutting and shaping in formation and thereby reduces the time and cost required to produce the tooth.

A further object of the invention is to provide a new artificial tooth having a plurality of grooves in a portion forming a part of a masticating surface to thereby facilitate mastication of food or the like by the user.

Various other objects, advantages and features of the invention will become apparent to those skilled in the art from the following description taken in connection with the accompanying drawings, in which:

FIG. 1 is an enlarged elevation view of a preferred specific embodiment of the artificial teeth of the invention and diagrammatically illustrating the preferred manner of constructing the tooth.

FIG. 2 is a transverse cross section through upper and lower denture means showing a preferred specific embodiment of the artificial tooth of the invention mounted therein.

FIG. 3 is a transverse cross section view through denture means showing the engagement of the teeth when the upper and lower plates are laterally displaced.

FIG. 4 is an enlarged elevation view of the teeth of FIG. 3 and diagrammatically illustrating a preferred manner of constructing same.

FIG. 5 is a transverse cross sectional view through denture means showing another preferred specific embodiment of the invention mounted therein.

Figure 6:
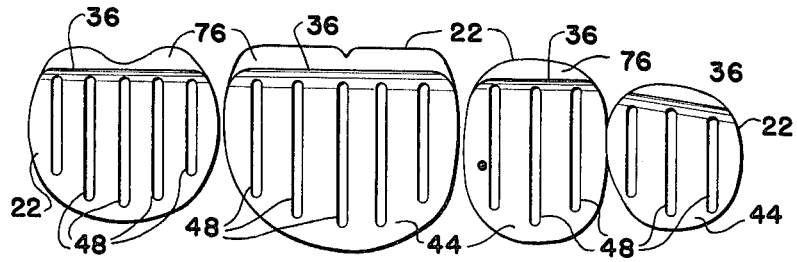
FIG. 6 is a plan view of the masticating surface of upper bicuspids and molars constructed in accordance with the invention.

The following is a discussion and description of preferred specific embodiments of the new artificial teeth and dentures of the invention, such being made with reference to the drawings whereon the same reference numerals are used to indicate the same and/or similar parts or structure. It is to be understood that such discussion and description is not to unduly limit the scope of the invention.

Figure 7:
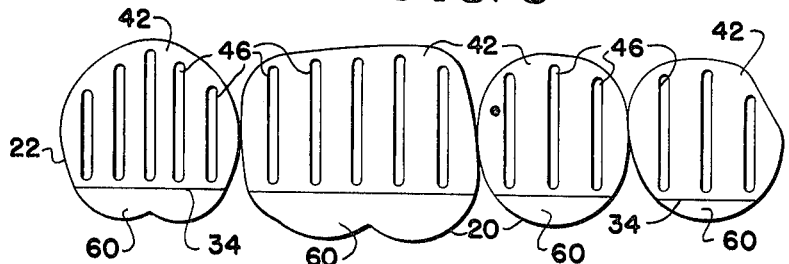
FIG. 7 is a plan view of the masticating surface of lower or bottom bicuspids and molars constructed in accordance with the invention.

Referring now to the drawings in detail and to FIGS. 1 and 2 in particular, a preferred specific embodiment of the teeth of the invention are illustrated including a lower tooth 20 and a corresponding upper tooth 22 which are illustrated in facing relation and in a lower plate 24 and an upper plate 26. The plates 24 and 26 can be partial plates, full plates, etc. The teeth of the invention are normally used as posterior teeth, that is, for the bicuspids and/or molars in artificial dentures. The teeth 20 and 22 each have a masticating surface thereon as shown generally at 30 and 32, respectively which desirably includes a substantially straight ridge shown at 34 and 36, respectively. The ridges 34 and 36 are desirably positioned in one edge portion of the masticating surface of teeth 20 and 22 and desirably extend substantially entirely across the teeth and form a cusp, the teeth desirably being positioned in the plates so that the ridges or cusp lines 34 and 36 are substantially continuous as best illustrated in FIGS. 6 and 7. As clearly illustrated, ridge 34 contacts the concavity of tooth 22, but ridge 36 does not contact concavity of tooth 20, being spaced by distance $a$. This relationship is important, and the reason will be explained in detail hereinafter.

The teeth 20 and 22 desirably each have a concave portion on the masticating surface as illustrated at 38 and 40, respectively, and preferably the concavities 38 and 40 terminate at one edge at the ridges 34 and 36 and extend substantially entirely across the teeth to form on the teeth and with adjacent teeth a substantially continuous concavity.

The edge portions of the teeth 20 and 22 opposite from the ridges 34 and 36, that is, the edge portions indicated at 42 and 44, respectively, are preferably substantially convex in shape. Generally flat portions 43 and 45 join the innermost portions of the edge portions 42 and 44 with the outermost portions of the concavities 38 and 40 to form a smooth and continuous surface therewith. Preferably the flat portions 43 and 45 of the teeth are tangent with the floors or outermost portions of the concavities 38 and 40 and with the innermost portions of the convex portions 42 and 44. The floors or outermost portions of the concavities 38 and 40 are desirably positioned adjacent the innermost portion of the flat portions 43 and 45. The flat portions 43 and 45 are substantially coplanar with tangents passing through the floor of the concavities and the innermost portions of the convex portions of the teeth. Thus, there is no obstruction or projecting portion of the teeth on the masticating surface at the edge portion thereof opposite from the ridges 34 and 36. In other words, the outermost portion of the convex portions 42 and 44 projects from the tooth no higher than the innermost portion or floor of the concavities 38 and 40.

Each of the teeth 20 and 22 is desirably provided with at least one groove in the masticating surface as shown at 46 and 48, respectively, and preferably a plurality of the grooves are provided in each of the teeth, such as shown in FIGS. 6 and 7 where three such grooves are shown on the bicuspids and five of the grooves are shown on the molars. Preferably the grooves 46 and 48 in each tooth are substantially parallel to each other and positioned in the concavity 38 and 40 of the masticating surfaces 30 and 32 with the ends of the grooves being adjacent to the ridges 34 and 36 and to the convex edge portions 42 and 44 of the teeth. If desired, the grooves can extend into the convex portions as shown in FIG. 2.

When mounting the teeth 20 and 22 in the plates 24 and 26 or the like, the teeth are preferably positioned in the plates so that the buccal ridges 34 of the posterior teeth strike substantially in the center portion of the cancavity and the flat portion of the masticating surface of opposed teeth, that is, the ridge 34 desirably engages the concavity 40 and flat portion 45 of the masticating surface 32 on tooth 22, and ridge 36 is desirably spaced from the concavity 38 and flat portion 43 of the masticating surface 30 of tooth 20. The spacing of ridge 36 from the concavity 38 is indicated on the drawing as $a$. The spacing dimension $a$ can be any suitable value, preferably in the range of 0.5 mm. to 0.4 mm., more preferably in the range of 1 mm. to 3 mm. This arrangement of ridges and concavities provides a new masticating function. The buccal ridge 34 in combination with concavity 40 provides a very effective cutting surface combination. The lingual ridge 36 in combination with spaced concavity 38 and surface 43 provides a very effective crushing surface means that directs the resultant masticated food inwardly toward the tongue where it is in position to be swallowed or forced outwardly to be further masticated. Preferably the tooth 20 on the lower plate 24 is mounted so that the ridge 34 thereof is on the buccal or outside of the plate and the ridge 36 on the upper tooth 22 is mounted so that the ridge 36 is on the inner or lingual side of the tooth. The buccal ridge can be spaced any suitable distance from the lingual edge of the teeth. Preferably, the buccal ridge is spaced in the range of ½ to ¾, most preferably ⅔ the total width of the tooth from the lingual edge of the tooth.

The dentures and teeth of the invention are constructed and adapted so that when the teeth are mounted in the dental plates 24 and 26 and the teeth 20 and 22 are in biting engagement in masticating food or the like the ridges 34 are engageable with the concavity 40 and flat portion 45 of the masticating surfaces and the teeth are movable laterally relative to each other without locking since the ridges are not engageable with any projecting structure. In other words, movement of the tooth 20 to the left and/or movement of the tooth 22 to the right in FIG. 2 will not result in locking of the teeth since the convex portions 42 and 44 project from the gum line a distance no greater than the floor of the concavities 38 and 40 and the flat portions 43 and 45 and thus no obstructions are present to interfere with lateral movement of the ridge of one tooth relative to the other tooth. Formation of the grooves 46 and 48 is quite desirable and results in more effective masticating food or the like by grinding the food against the grooved tooth surface. Since the grooves are substantially perpendicular to the ridges 34 and 36 they will not receive the ridges and cause locking of the teeth.

FIG. 3 illustrates how the plates of a denture of my invention provided with teeth of my invention can be shifted laterally without danger of locking. The denture plates in normal use in the mouth are shifted laterally during chewing in the general manner indicated, but usually to a lesser extent. The teeth 20 in dotted lines illustrate the position that the plate 24 can be shifted laterally without radically altering the parallel arrangement of the plates. The amount of lateral displacement is indicated by the displacement for vertical axis 25. The position of lower teeth 20 indicated in solid lines, and plate 24 illustrates the extreme lateral position that the denture plates can be moved before the ridges 112 and 114 will contact each other. I have found it very advantageous that the ridges 112 on the lingual side of the upper teeth 22 can only contact the lower teeth 20 when in the extreme lateral position shown in the drawings, FIG. 3. The non-parallel arrangement is illustrated by lines drawn through the flat portions of the concavities of the respective teeth in the respective upper and lower plates. Line 21 is a line drawn across the concavities of lower teeth 20, and line 23 is a line drawn through the concavtities of the upper teeth 22. In normal centered position and positions of lateral displacement the lines 21 and 23 are parallel.

FIG. 1 illustrates a preferred manner of determining or describing the outer surfaces of the teeth 20 and 22. In constructing the teeth a base diameter or line 50 is first laid off across the greatest lateral or transverse dimension of the tooth 20 and the line 52 is laid off through the desired median occlusion line of the teeth relative to the lower tooth. At a point on the median occlusion line 52 which is approximately 51/90 of the distance across tooth 20 at the base diameter 50 from the cheek or buccal side of the tooth, that is, the left side shown in FIG. 2, a line 54 is erected substantially perpendicular to line 52. A point 56 on line 54 is located which is approximately 28/90 of the distance across the base diameter or line 50 and the point 56 is measured from the line 52. Using the point 56 as a center point and using a radius of approximately 83/180 of the base diameter or line 50 a segment of a circle is struck off and desirably extends approximately 48 degrees on the cheek or buccal side of the perpendicular line 54 and describes the concavity 38. The uppermost edge of the line thus described in the outermost portion of the masticating surface and locates the ridge 34 on the masticating surface. The side of the tooth adjacent the ridges and opposite from the concave surfaces is defined by a straight line 60 approximately 48 degrees to the line 52 and passing through the uppermost end of the arcuate line struck off from point 56. Line 60 and concavity 38 define the ridge 34.

A point 62 is located which is approximately one-fourth of the base line 50 from the right or lingual side of the tooth 20 is also approximately one-fourth of the base line from a tangent to the concavity 38 at the line 54. Using the point 62 as the center point and with a radius of one-fourth of the base line or diameter 50 a 90° arc is described which defines the convex surface 42. The terminal or innermost portion of the convex surface 42 will be substantially in line with the outermost or foot portion of the concavity 38, and a straight line or plain surface 43 connects the portion of the tooth between the perpendicular line 54 and the innermost edge portion of the convex portion 42 of the tooth. Line 43 is thus substantially tangent to both the foot of the concavity 38 and the innermost portion of the convex portion 42.

The tooth 22 is constructed in substantially the same manner as the tooth 20. At a point on line 52 substantially 7/18 of the base line or diameter 50 a perpendicular line 72 is erected and a point 74 is located on the line 72 which is approximately 28/90 of the base diameter 50 outwardly away from the tooth 22. Using a radius of approximately 83/180 of the base diameter or line 50 a segment of a circle is described extending approximately 48 degrees to the tongue or lingual side of the perpendicular line 72 which forms the concavity 32 on the tooth 22. One end of the 48 degree segment of the circle thus described terminates at the point on tooth 22 which forms the ridge 36. The side 76 of tooth 22 is formed by a line approximately 48 degrees to the median occlusion line 70 passing through the ridge 36. The height of ridge 36 relative to concavity 38 and surface 43 is controlled by either shortening same by varying the appropriate dimensions, or tilting the tooth 22 relative to tooth 22.

A line 78 is located approximately 1/4 of the length of the base line 50 above the left side or edge of the concavity 32 on the tooth 22, that is upwardly on the line 72 a distance into the tooth 22 equal to one-fourth of the base line 50. Along the line 78 a point 80 is located which is one-fourth of the distance from the buccal or outside edge of the tooth 22. Using the point 80 as the center and with a radius equal to one-fourth of the length of the base line 50 an arc of approximately 90° is described which forms the convex portion 44 of tooth 22. The innermost portion of the convex portion 44 of tooth 22 is then substantially in line with the foot or lowermost portion of the concavity 32 and the flat surface 45 is then drawn between these two terminal points. The surface 45 is substantially tangent to both the foot of concavity 32 and the innermost portion of convex portion 44. Thus, the upper tooth 22 is formed having a masticating surface thereon which is substantially complementary to and in opposed relation to the masticating surface on the tooth 20. When the teeth 20 and 22 are in biting engagement with each other, the ridge 34 engages the concavity or flat portion of the tooth 22. The teeth 20 and 22 are movable laterally relative to each other without meeting obstructions tending to lock the dentures.

Another preferred specific embodiment of the teeth of the invention is illustrated in FIGS. 5 and 6 of the drawings where full or partial dental plates or the like 100 and 102 are shown. Lower teeth 104 are mounted in the plate 100 and upper teeth 106 are mounted in the plate 102. The teeth 104 and 106 are preferably posterior teeth, such as the molars and/or bicuspids. The teeth 104 and 106 each have a masticating surface thereon as shown at 108 and 110, respectively, and have ridges 112 and 114, respectively. The ridges 114 and 112 desirably extend across the teeth and are positioned to form with adjacent teeth a substantially continuous ridge or the like. The ridges 112 form cutting cusps in use. The ridges 114 are spaced from masticating surfaces 108 a distance $b$.

The teeth 104 and 106 each have a concavity therein as shown at 116 and 118 which terminates at one edge at the ridges 112 and 114 and extend across the teeth to form with adjacent teeth a substantially continuous concavity. The edge portions 120 and 122 of the masticating surfaces of the teeth 104 and 106, respectively, are preferably flat and are substantially parallel with the gum lines 124 and 126 and are also substantially tangent to the foot of the concavities 116 and 118. The innermost portion of the flat edge portions 120 and 122 of the teeth smoothly merge into the floor or lower portion of the concavities 116 and 118. The floor of the concavities 116 and 118 are adjacent the innermost portions of the flat edges 120 and 122 and are substantially a continuation of the innermost portion of the flat edge portions of the teeth.

The sides 128 and 130 of the teeth 104 and 106, respectively are preferably generally arcuate in shape and meet the adjacent flat edge portions 120 and 122, respectively at relatively sharp corners. As will be seen from the foregoing description, the teeth 104 and 106 are constructed so that no obstruction or projection is present on the edge portion of the teeth opposite from the ridges on which the ridge of an opposing tooth could engage during use and cause locking of the teeth or dentures.

Each of the teeth 104 and 106 are preferably provided with at least one groove therein as shown at 132 and 134, respectively, and desirably a plurality of the grooves are provided in the manner illustrated in FIGS. 6 and 7. Preferably the grooves are substantially parallel to each other and are located in the concavity 116 and 118 and extend into the flat portions 120 and 122 of the masticating surfaces and desirably terminate in spaced relation to the ridges 112 and 114 and to the edge portions of the teeth opposite from the ridges.

The teeth 104 are mounted in the plate 100 in such a manner that the ridges 112 thereon are on the buccal or outside of the denture and are engageable with the concavity and/or flat portion of the opposed teeth. The teeth 106 are mounted in the plate 102 so that the ridges 114 are on the lingual side and are spaced from the concavity 116 and the flat portion 120 of the teeth 104 when in closed position. With the teeth mounted in the plates and when they are in biting engagement they can move laterally relative to each other without the ridges 112 and 114 engaging obstructions or being positioned in valleys or the like which cause the teeth to lock in position and prevent proper masticating of food or the like.

In constructing the teeth 104 and 106 a procedure somewhat similar to that described hereinbefore in connection with FIG. 2 is preferably used. First of all, a base line or diameter 140 is preferably marked off at the greatest cross lateral dimension of the lower tooth 104 and a horizontal line 142 is provided through the desired median occlusion line of the teeth relative to the lower tooth 104. At a point on the line 142 which is substantially $51/90$ of the length of the base line 140, a perpendicular line 144 is erected and extends above the median occlusion line 142. A point 146 is located on line 144 which is approximately $28/90$ of the length of the base line 140 above the median occlusion line 142 and using the point 146 as a center, a radius of approximately $83/180$ of the base line or diameter 140 is used to scribe a segment of a circle approximately 48 degrees to the left side of the perpendicular line 144 and this describes the concavity 116 of the lower tooth. The line or segment of a circle thus scribed terminates at the ridge 112. The adjacent surface 148 of the tooth 104 is defined by a straight line at approximately 48 degrees to the median occlusion line 142 which intersects the ridge 112. The flat portion 120 of tooth 104 is a line which is substantially tangent to the concavity 116 at the intersection of the concavity and the vertical line 144 and this flat portion is substantially parallel to the gum line 124. The surface 128 of the tooth can be of any suitable arcuate surface or preferably substantially that of a natural tooth.

In constructing the tooth 106 a point on the median line 142 which is approximately $7/18$ of the length of the base diameter or line 140 is located and a perpendicular line 152 is erected thereon. A point 154 on the perpendicular line 152 is located which is approximately $28/90$ of the base diameter of line 140 below the median occlusion line 142. Using the point 154 on line 152 as the center and using a radius of approximately $83/180$ of the length of the base diameter or line 140 a segment of a circle is scribed approximately 48 degrees to the tongue side or right side of the perpendicular line 152 and thus describes the concavity 118 on the tooth 106. The surface 156 on the edge of tooth 106 adjacent the end of the concavity is defined by a line which is approximately 48 degrees to the median occlusion line 142 and intersects the end of the concavity 118. The ridge 114 is defined by the surface 156 and the adjacent end of the concavity. The portion of the masticating surface of tooth 106 to the left or on the buccal side of the perpendicular line 152 is flat as indicated at 122 and is substantially tangent to the floor of the arcuate surface or concavity 118. The flat surface 122 thus forms a smooth and continuous surface with the edge of the concavity 118 opposite the ridge 114. The side surface 130 of tooth 106 is desirable curved or arcuate as shown and is preferably shaped substantially the same as a natural tooth. Tooth 104 is shaped in the same general manner as described above.

As indicated the ridge 114 is spaced from the concavity 116 and surface 120 by a dimension $b$. The dimension $b$ can be any suitable value. Preferably it is in the range of 0.5 mm. to 4 mm., more preferably in the range or 1 mm. to 3 mm. The spacing of ridge 114 from the opposing tootht provides a crushing surface combination that direct the resultant masticated food inwardly toward the lingual side. The shape and/or the positioning of the teeth can be varied in any suitable manner to achieve the desired spacing.

Since the molars and bicuspids are normally of different sizes and extend along the plates varying distances, the length of the ridges and cusps formed thereon are somewhat variable as will be apparent from FIGS. 6 and 7. Likewise, there may be some slight gap or hiatus between the various teeth when mounted in the plates by the ridges and grooves are substantially continuous from tooth to tooth.

Figure 8:
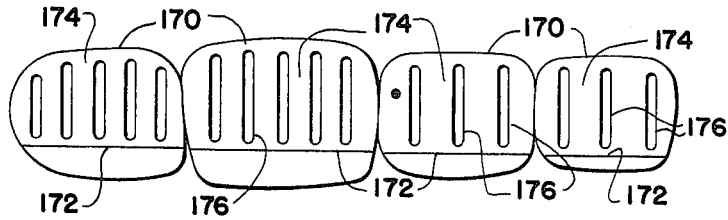
FIG. 8 is a plan view of lower bicuspids and molars of a modified construction of the teeth of the invention.

In some instances it will be desirable to form the teeth with substantially squared shoulders to provide more cusps or ridges and concavities than occurs in the more conventional rounded teeth as shown in FIGS. 6 and 7. Such an embodiment is illustrated in FIG. 8 of the drawings where the teeth are shown generally at 170 with the ends or sides thereof being substantially squared or flat and positioned in abutting relation to be in direct contact over a substantial portion of the contacting surface or ends and so that the ridges 172 formed on the teeth are substantially continuous across the teeth as are the valleys 174. The ridges and valleys of teeth 170 can be constructed in the manner shown in FIGS. 1–4 of the drawings. The teeth 170 are provided with a plurality of substantially parallel grooves 176 in the manner described hereinbefore in connection with FIGS. 1–7.

Figure 9:
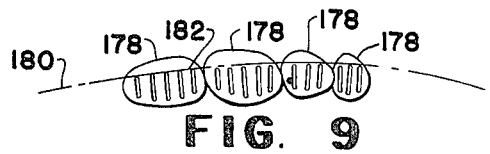
FIG. 9 is a plan view on a smaller scale of teeth constructed in accordance with the invention illustrating mounting of same in curved alignment.
Figure 10:
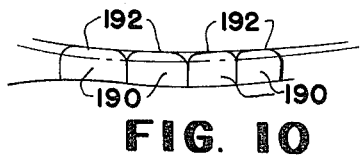
FIG. 10 is a side view of teeth constructed in accordance with the invention and showing same mounted in vertically curved alignment.
Figure 11:
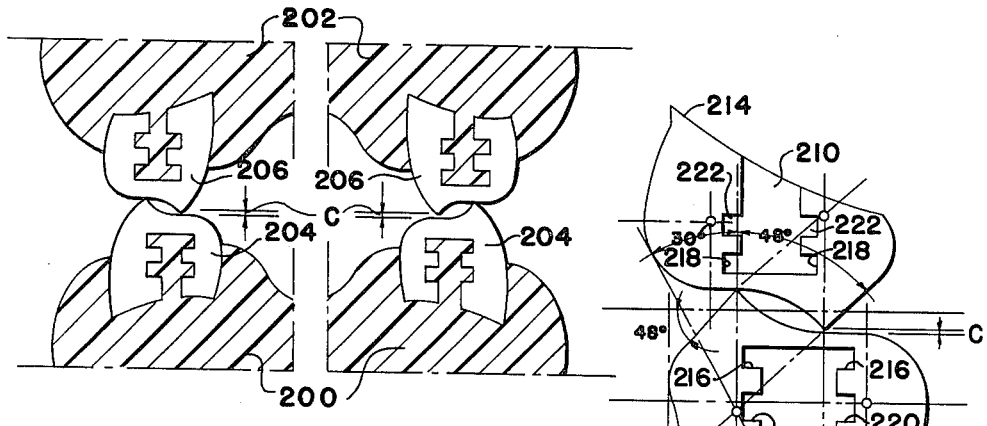
FIG. 11 is a transverse cross section view through a set of dentures or the like illustrating mounting means for artificial teeth.
Figure 12:
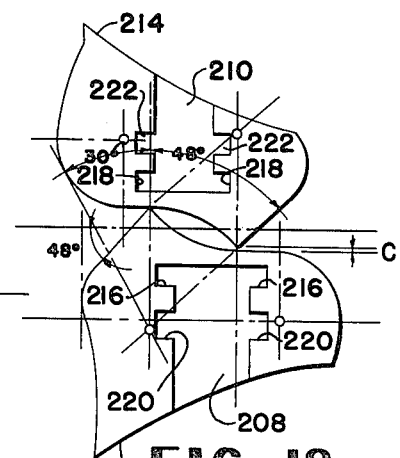
FIG. 12 is an enlarged elevation view of the teeth of FIG. 11 illustrating construction of same.

When mounted in the plates the teeth of the invention can be in substantially direct longitudinal alignment as illustrated especially in FIGS. 6–8. In some instances it is desirable to mount the teeth in a slight arc or curve extending along the curve of the mandible and such is illustrated in FIG. 9 by the teeth 178 where the axis or line 180 described along the line of the ridges 182 of the teeth 178 is curved slightly to conform to the shape of the mandible. Also, in some instances, it is desirable to shape the teeth so that they are curved in a vertical direction as illustrated in FIG. 10 where the teeth 190 have ridges 192 thereon which are arcuate or curved slightly as illustrated by the side view in FIG. 10. Also, it is desirable to combine the curvatures illustrated in FIGS. 9 and 10 in some instances so that the teeth are curved both vertically and arcuately to conform to the mandible shape.

FIGS. 11–15 of the drawings illustrate another preferred specific embodiment of the invention wherein means are provided to easily mount the teeth or the like in a denture, plate or the like. In this embodiment the lower and upper dental plates or the like are shown at 200 and 202, respectively, and are preferably made of a molded material, such as a suitable plastic material. The plate 200 has a plurality of lower teeth 204 mounted therein and the upper plate 202 has a plurality of teeth 206 mounted therein. The teeth 204 and 206 can be of any suitable construction, including the preferred specific embodiments of the teeth set forth in the embodiments of the invention shown in FIGS. 1–9 and the teeth illustrated in FIGS. 10–14 are constructed as described in connection with FIGS. 1 and 2 of the drawings. The teeth are arranged to provide clearance c between the lingual ridge and opposing tooth.

Figure 13:
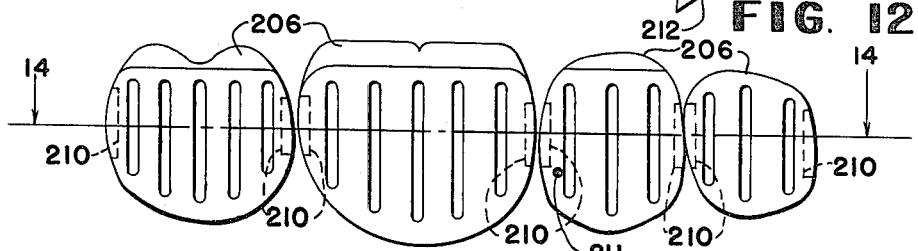
FIG. 13 is a plan view of the masticating surface of the teeth of FIGS. 11 and 12 and showing the upper bicuspids and molars in plan view.
Figure 14:
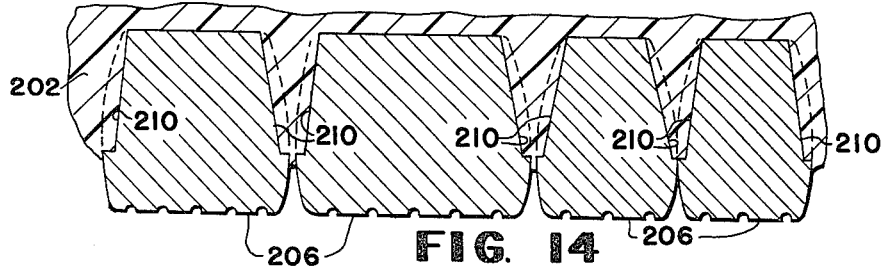
FIG. 14 is a longitudinal cross section view taken along the line 14—14 of FIG. 13.
Figure 15:
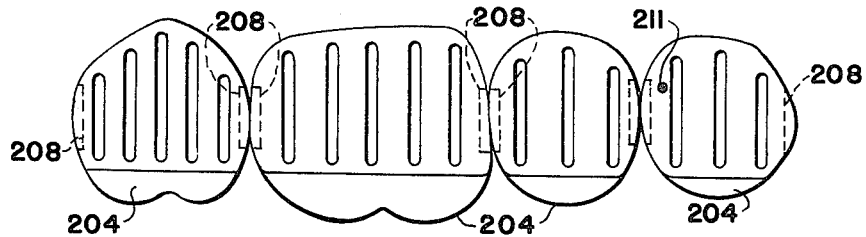
FIG. 15 is a plan view of the lower molars and bicuspids of the teeth of FIGS. 11 and 12.

The teeth 204 and 206 are each provided with mounting grooves 208 and 210 which are located in the sides or ends of the teeth adjacent other ones of the teeth as best illustrated in FIGS. 13–15. The grooves 208 and 210 desirably extend from the root portions 212 and 214 of the teeth 204 and 206, respectively, to an intermediate portion of the teeth as illustrated in the drawings. Preferably the grooves 208 and 210 are wider at the innermost portion of the grooves as illustrated at 216 and 218 and are also wider at an intermediate portion of the grooves as shown at 220 and 222 than the grooves are at the root of the teeth or at the portions of the grooves between the widened portions thereof. The widened portions 216, 218, 220 and 222 serve as anchors when mounting the teeth in place in the denture plates or the like 200 and 202.

When mounting the teeth 204 and 206 in the dentures 200 and 202, respectively, the plastic material of which the plates are formed pours or flows into the grooves 208 and 210 substantially fills same, including the enlarged or widened portions thereof. When the teeth are mounted the plastic material of the plates is positioned in the grooves illustrated in FIGS. 11 and 14 of the drawings. The enlarged or anchor portions 216, 218, 220 and 222 of the teeth receive portions of the plate as illustrated and prevent outward movement of the teeth relative to the plates. The teeth can be positioned in close fitting or even abutting relation and still be mounted in the manner described hereinbefore since the plastic material will flow into the grooves of facing or abutting teeth and does not effect spacing or other mounting considerations.

Preferably the teeth in the denture plates are provided with alignment dots 211, shown in FIGS. 13 and 15. These dots 211 can be used to correlate and equilibrate the dentures using the apparatus and techniques set forth in Patent No. 3,068,570, of which I am a joint inventor.

While the teeth of FIGS. 11–14 are shaped and constructed in the manner shown and described hereinbefore in connection with FIGS. 1 and 2, it is to be understood that other teeth constructions described herein as well as on other types of teeth can also be mounted in the manner shown in FIGS. 11–14 without departing from the invention.

While the invention has been described in connection with preferred specific embodiments thereof it will be understood by those skilled in the art that such is intended to illustrate and not to limit the scope of the invention which is defined by the claims.

I claim:

1. A lockless artificial denture comprising, in combination, upper and lower mounting plates, artificial teeth mounted in said plates with said teeth in said upper plate positioned in facing relation to said teeth in said lower plate, at least the posterior teeth in said upper and lower plates each having a masticating surface thereon having a ridge at one edge thereof positioned to form with adjacent ones of said posterior teeth a substantially continuous cusp, said posterior teeth each being concave on the upper surface with the concavity terminating at one edge at said ridge and extending across said teeth to form with adjacent teeth a substantially continuous concavity, the edge portion opposite from said ridge of each of said posterior teeth being convex, each of said teeth having a narrow flat portion tangent to and smoothly merging into the floor of said concavities and the innermost portion of said convex edge portions, said flat portions being coplanar with a tangent through said floor of said concavity and through said innermost portion of said edge portion of said convex portion of each of said teeth, each of said posterior teeth having a plurality of substantially parallel transverse grooves in said concavity with the ends of said grooves being adjacent said ridge and extending into said convex edge portion of said teeth, said ridges on said posterior teeth in said lower plate being on the buccal side and positioned to strike substantially in the center portion of said concavity of said posterior teeth of said upper plate, and said ridges on said posterior teeth in said upper plate being on the lingual side and positioned substantially in the center portion of said concavity in said posterior teeth of said lower plate, said ridges on said posterior teeth in the upper plate having a longitudinal height that is less than longitudinal height of said ridges on said posterior teeth in the lower plate, said denture being constructed and adapted and said teeth positioned therein so that when said posterior teeth are in centric biting engagement and when masticating food or the like said ridge on the lower posterior teeth is in engagement with said concavity of opposing upper posterior teeth and the ridges on the upper posterior teeth and concavities of the lower posterior teeth maintaining a spaced relation thereby forming crushing surfaces that direct the resultant masticated food inwardly, and with contact between said ridge on the upper posterior teeth in engagement with the lower posterior teeth only in extreme lateral position, and with said teeth being shaped to prevent locking of opposing teeth and said denture.

2. The denture as defined in claim 1 wherein each of said posterior teeth has mounting grooves therein in opposite end portions thereof extending from a root portion of said teeth to an intermediate portion thereof, said mounting grooves being wider at the innermost end portion and at an intermediate portion thereof than at the outermost portion thereof, said plates being formed of a molded plastic material with a portion of said material of said plates positioned in said mounting grooves in said teeth to attach said teeth to said plates.

3. A lockless artificial denture comprising, in combination, upper and lower mounting plates, artificial teeth mounted in said plates in facing relation to each other, at least the posterior teeth in said plates each having a ridge thereon with an adjacent concavity terminating at one edge of said ridge with said ridge and said concavity forming with adjacent teeth a substantially continuous ridge and concavity, one ridge being on the buccal side of the teeth and the ridge on the opposing teeth being on the lingual side of the teeth, each of said teeth having a convex edge portion positioned opposite from said ridge, each of said teeth having a flat portion tangent to and smoothly merging into the floor of said concavities and the innermost portion of said convex edge portion of said teeth, each of said posterior teeth having a plurality of substantially parallel grooves in said concavity thereof extending substantially entirely thereacross, said ridges on said posterior teeth on said lower plate being positioned to strike substantially in the center portion of said concavity of said posterior teeth of said upper plate, and said ridges on said posterior teeth in said upper plate being dimensioned and positioned to in closed centric position assume a spacing of from 1 mm. to 3 mm. from the general center portion of said concavity of said posterior teeth of said lower plate, said denture being constructed and adapted and said teeth positioned therein so that when positioned in the mouth and when said posterior teeth are in centric biting engagement said ridges on the buccal side are engaged with said concavity of opposing teeth and the ridges on the lingual side are spaced from the concavity of the opposing teeth, and with contact between said ridge on the upper posterior teeth in engagement with the lower posterior teeth only in extreme lateral position, and with said teeth being shaped to prevent locking of opposing teeth and said denture.

4. A lockless artificial denture comprising, in combination, upper and lower mounting plates, artificial teeth mounted in said plates with said teeth in said upper plate positioned in facing relation to said teeth in said lower plate, at least the posterior teeth in said upper and lower plates each having a masticating surface thereon having a ridge at one edge portion thereof positioned to form with adjacent ones of said posterior teeth a substantially continuous cusp, said posterior teeth each having a concavity terminating at one edge at said ridge and extending across said teeth to form a substantially continuous concavity with adjacent teeth, the edge portion opposite from said ridge of each of said posterior teeth being flat and substantially parallel with the gum line with the innermost portion of said flat edge portion smoothly merging into said concavity, the floor of said concavity adjacent said innermost portion of said flat edge portion of each of said teeth being substantially a continuation of said innermost portion of said flat edge portion of said teeth, the side of each of said teeth adjacent said flat edge portion meeting said flat edge portion in a sharp corner, each of said posterior teeth having a plurality of substantially parallel grooves in said concavity therein with the ends of said grooves being adjacent said ridge and said flat edge portion of said teeth opposite from said ridge, said ridges on said posterior teeth in said lower plate being on the buccal side and positioned to strike substantially in the center portion of said concavity of said posterior teeth of said upper plate, and said ridges on said posterior teeth in said upper plate being on the lingual side and positioned to assume in closed centric position a spaced relationship with the approximate center portion of said concavity in said posterior teeth of said lower plate, said spacing being in the range of 1 mm. to 3 mm., said denture being constructed and adapted and said teeth positioned therein so that when said posterior teeth are in centric biting engagement and when mastiacting food or the like said ridges of said posterior teeth in said lower plate are in engagement with said concavity of opposing teeth and said ridges of said posterior teeth in said upper plate are in spaced relationship to said concavity of opposing teeth forming crushing surfaces that direct the resultant masticated food inwardly, and with contact between said ridge on the upper posterior teeth in engagement with the lower posterior teeth only in extreme lateral position, and said teeth are shaped to prevent locking of opposing teeth and said denture.

5. A lockless artificial denture comprising, in combination, upper and lower mounting plates, artificial teeth mounted in said plates and positioned in facing relation, at least the posterior teeth in said upper and lower plates each having a ridge at one edge portion thereof and a concavity terminating in one edge at said ridge with said ridges and said concavities of adjacent ones of said teeth forming substantially continuous ridges and concavities, one ridge being on the buccal side of the teeth and the ridge on the opposing teeth being on the lingual side of the teeth the edge portion opposite from said ridge of each of said posterior teeth being flat and substantially parallel to the gum line with said flat edge portion merging smoothly into said concavity, the floor of said concavity being adjacent the innermost portion of said flat portion of each of said teeth and being substantially a continuation of said innermost portion of said flat edge portion of said teeth, each of said posterior teeth having a plurality of grooves therein in said concavity thereof, said ridges of said teeth being positioned to strike substantially in the center portion of said concavity of opposing teeth in centric position, said denture being constructed and adapted and said teeth positioned therein so that said ridges on the buccal side are in engagement with and the ridges on the lingual side are spaced from the concavity of the opposing teeth, and with contact between said ridge on the upper posterior and the lower posterior teeth in engagement with the lower teeth only in extreme lateral position, and with said teeth being shaped to prevent locking of opposing teeth and said denture.

6. In a denture, upper and lower opposing artificial human teeth arranged in substantially parallel rows, each of said teeth comprising a body having a masticating surface including a ridge at one edge portion thereof with a concavity adjacent thereto, said ridge and said concavity extending substantially parallel to each other along said teeth and substantially parallel with said rows of said teeth, each of said teeth being free of obstructions at the edge portion thereof opposite from said ridge with the plane through the surface of said concavity at said opposite edge portion being substantially parallel to the gum line, said ridge of each of said lower teeth being on the buccal side thereof and arranged to strike substantially in the center of said concavity of said upper teeth, and said ridge of each of said upper teeth being on the lingual side and arranged to assume a spacing from the approximate center of said concavity of said lower teeth when said ridges of said lower teeth strike said concavities of said upper teeth in centric position, said spacing being in the range of from 0.5 mm. to 4 mm., and each of said teeth having a plurality of substantially parallel grooves in said valley thereof extending from adjacent said ridge across said valley approximately perpendicular to said ridge, said denture being constructed and adapted and said teeth positioned therein so that said ridge of said upper teeth is in engagement with the lower teeth only in extreme lateral position.

7. The denture as defined in claim 6 wherein each of said teeth has mounting grooves therein in opposite end portions thereof and extending from the root of said teeth to an intermediate portion thereof, each of said mounting grooves being widened at a portion thereof in spaced relation to said root of said teeth, and upper and lower plates constructed on a molded plastic material mounting said teeth with a portion of said material of said plates positioned in said mounting grooves in said teeth to attach said teeth to said plates.

8. In a denture, sets of upper and lower posterior teeth positioned in opposed relation, each set of teeth including a plurality of teeth each having a masticating surface including a concavity having a plurality of substantially parallel grooves thereacross with said concavity of said teeth in each of said sets of teeth being in substantially longitudinal alignment with each other, each of said teeth having a ridge thereon at one edge portion thereof forming cutting cusps, said ridges on said upper and said lower positioned on opposite buccal and lingual sides, each of said teeth being free of obstructions at the edge portion thereof opposite from said ridge with the plane through the surface of said concavity at said opposite edge portion being substantially parallel to the gum line, the ridges on the buccal side being positioned to engage said concavities of opposing teeth with the ridges on the lingual side being positioned in spaced relation to said concavities of the opposing teeth when in centric biting relation therewith, said denture being constructed and adapted and said teeth being positioned therein so that said ridge of said upper teeth is in engagement with the lower teeth only in extreme lateral position.

9. In a denture, upper and lower artificial teeth positioned in opposed relation a ridge on the buccal side of one of said upper and lower artificial teeth and a ridge on the opposing teeth on the lingual side thereof, each of said teeth having a concavity and a ridge at one edge of said concavity forming a cutting cusp, each of said teeth being free of obstructions at the edge portion thereof opposite from said ridge with the plane of a tangent to the surface of said concavity at said opposite edge portion being substantially parallel to the gum line, said ridges on the buccal side being positioned relative to opposing teeth to engage said concavities of opposing teeth when in centric biting relation therewith, said ridges on the lingual side being positioned relative to opposing teeth to maintain a spaced relationship to said concavities of opposing teeth when said teeth are in centric biting relation, said teeth being constructed and adapted and said teeth being positioned therein so that the ridge of the upper teeth is in engagement with the lower teeth only in extreme lateral position.

10. In a denture, upper and lower artificial teeth positioned in opposed relation, each of said teeth having a concavity and a ridge at one edge of said concavity forming a cusp, said upper and lower teeth positioned in said denture with the ridges formed by the cusps of the respective teeth forming generally parallel lingual and buccal ridges, the buccal ridge constructed to strike the concavities of the opposing teeth forming cutting means for food, and the lingual ridge constructed to assume a spaced relation with the concavities of the opposing teeth when said denture is in centric biting position to thereby form a crushing means and that directs the resultant masticated food toward the lingual side of same, said teeth being constructed and adapted and said teeth being positioned therein so that the ridge of the upper teeth is in engagement with the lower teeth only in extreme lateral position.

11. A denture comprising upper and lower artificial teeth positioned in opposed relation, each of said teeth comprising a masticating surface and a ridge extending across the tooth adjacent one edge thereof to form a cutting cusp, said masticating surface having a concave portion terminating at one end in the ridge and at the other end in a flat portion, said flat portion merging into the opposite edge of the tooth to form a smooth and continuous surface extending substantially entirely across the tooth, the ridge on the lower teeth being positioned relative to opposing teeth to engage the masticating surface of the opposing teeth when in centric biting relation therewith, said denture being constructed and adapted and said teeth being shaped and positioned therein providing crushing surfaces between opposed teeth that direct resultant masticated food inwardly and preventing locking of opposing teeth and said denture.

12. A denture comprising, upper and lower artificial teeth positioned in opposed relation, each of said teeth comprising a masticating surface and a ridge extending across the tooth adjacent one edge thereof to form a cutting cusp, said masticating surface having a concave portion terminating at one end in the ridge and at the other end in a substantially flat portion, said substantially flat portion merging into the opposite edge of said tooth forming a smooth and continuous surface extending substantially entirely across the tooth, and the ridge on the lower teeth being positioned relative to the upper teeth to engage the masticating surfaces of the upper teeth when in centric biting relation therewith.

References Cited by the Examiner

UNITED STATES PATENTS 2,570,562 10/1951 Kinsley _____ 32—2
2,600,496 6/1952 Hall _____ 32—?

FOREIGN PATENTS 760,924 11/1956 Great Britain.

RICHARD A. GAUDET, *Primary Examiner.*

ROBERT E. MORGAN, *Examiner.*